United States Patent
Furuichi et al.

(10) Patent No.: US 11,329,274 B2
(45) Date of Patent: May 10, 2022

(54) POSITIVE ELECTRODE ACTIVE MATERIAL FOR NONAQUEOUS ELECTROLYTE SECONDARY BATTERIES, AND PRODUCTION METHOD THEREOF

(71) Applicant: SUMITOMO METAL MINING CO., LTD., Tokyo (JP)

(72) Inventors: Yuki Furuichi, Niihama (JP); Tetsufumi Komukai, Niihama (JP)

(73) Assignee: Sumitomo Metal Mining Co., Ltd.

( * ) Notice: Subject to any disclaimer, the term of this patent is extended or adjusted under 35 U.S.C. 154(b) by 0 days.

(21) Appl. No.: 17/076,077

(22) Filed: Oct. 21, 2020

(65) Prior Publication Data
US 2021/0036309 A1 Feb. 4, 2021

Related U.S. Application Data

(62) Division of application No. 15/555,597, filed as application No. PCT/JP2016/056177 on Mar. 1, 2016, now Pat. No. 10,854,873.

(30) Foreign Application Priority Data

Mar. 3, 2015 (JP) .................................. 2015-041681
Aug. 26, 2015 (JP) .................................. 2015-167280

(51) Int. Cl.
*H01M 4/36* (2006.01)
*H01M 4/505* (2010.01)
(Continued)

(52) U.S. Cl.
CPC .............. *H01M 4/36* (2013.01); *C01G 53/42* (2013.01); *H01M 4/0471* (2013.01);
(Continued)

(58) Field of Classification Search
CPC ....................................................... C01G 53/42
See application file for complete search history.

(56) References Cited

U.S. PATENT DOCUMENTS 9,130,212 B1 9/2015 Kokado et al.
11,108,043 B2 * 8/2021 Kondo .................. C01G 53/42
(Continued)

FOREIGN PATENT DOCUMENTS

JP 11-16566 1/1999
JP 2005-251716 9/2005
(Continued)

OTHER PUBLICATIONS

Watanabe et al. English machine translation of JP 2010040383 A (Year: 2010).*
International Search Report dated May 17, 2016.

*Primary Examiner* — Peter F Godenschwager
(74) *Attorney, Agent, or Firm* — Gerald E. Hespos; Michael J. Porco; Matthew T. Hespos

(57) ABSTRACT

A method for producing a positive electrode active material for nonaqueous electrolyte secondary batteries, includes: a mixing step of adding a W compound powder having a solubility A adjusted to 2.0 g/L or less to a Li-metal composite oxide powder and stirring in water washing of the composite oxide powder, the solubility A being determined by stirring the W compound in water having a pH of 12.5 at 25° C. for 20 minutes, the composite oxide powder being represented by the formula: $Li_cNi_{1-x-y}Co_xM_yO_2$ and composed of primary and secondary particles, followed by solid-liquid separation, to thereby obtain a tungsten-containing mixture with the tungsten compound dispersed in the composite oxide powder; and a heat-treating step of heat-treating the mixture to uniformly disperse W on the surface of primary particles and thereby form a compound contain- (Continued)

ing W and Li from the W and Li in the mixture, on the surface of primary particles.

6 Claims, 4 Drawing Sheets

(51) Int. Cl.
| | |
|---|---|
| *H01M 4/131* | (2010.01) |
| *H01M 4/485* | (2010.01) |
| *C01G 53/00* | (2006.01) |
| *H01M 4/04* | (2006.01) |
| *H01M 4/525* | (2010.01) |
| *H01M 10/0525* | (2010.01) |
| *H01M 4/02* | (2006.01) |

(52) U.S. Cl.
CPC ........... *H01M 4/131* (2013.01); *H01M 4/364* (2013.01); *H01M 4/485* (2013.01); *H01M 4/505* (2013.01); *H01M 4/525* (2013.01); *H01M 10/0525* (2013.01); *C01P 2002/52* (2013.01); *C01P 2002/54* (2013.01); *C01P 2002/85* (2013.01); *C01P 2004/50* (2013.01); *C01P 2004/82* (2013.01); *C01P 2004/84* (2013.01); *C01P 2006/40* (2013.01); *H01M 2004/028* (2013.01)

(56) References Cited

U.S. PATENT DOCUMENTS

| | | |
|---|---|---|
| 2006/0204849 A1 | 9/2006 | Saito et al. |
| 2010/0209771 A1 | 8/2010 | Shizuka et al. |
| 2012/0276446 A1 | 11/2012 | Kawai |
| 2013/0011726 A1 | 1/2013 | Takano et al. |
| 2013/0309580 A1 | 11/2013 | Tomura |
| 2014/0087263 A1 | 3/2014 | Matsumoto et al. |
| 2014/0329146 A1 | 11/2014 | Niina et al. |
| 2015/0021518 A1 | 1/2015 | Kokado et al. |
| 2015/0228974 A1 | 8/2015 | Kokado et al. |
| 2017/0054147 A1 | 2/2017 | Yokoyama et al. |

FOREIGN PATENT DOCUMENTS

| | | |
|---|---|---|
| JP | 2009-289726 | 12/2009 |
| JP | 2010-40383 | 2/2010 |
| JP | 2012-238581 | 12/2012 |
| JP | 2013-125732 | 6/2013 |
| JP | 2013-152866 | 8/2013 |
| JP | 2013-171785 | 9/2013 |
| JP | 2013-229339 | 11/2013 |
| KR | 10-2013-0051012 | 5/2013 |
| WO | 2012/105048 | 8/2012 |
| WO | 2013/015069 | 1/2013 |
| WO | 2015/163273 | 10/2015 |

* cited by examiner

POSITIVE ELECTRODE ACTIVE MATERIAL FOR NONAQUEOUS ELECTROLYTE SECONDARY BATTERIES, AND PRODUCTION METHOD THEREOF

The present application is a divisional application of U.S. patent application Ser. No. 15/555,597, filed Sep. 5, 2017, the contents of which are hereby incorporated by reference in their entirety.

BACKGROUND

Field of the Invention

The present invention relates to a positive electrode active material for nonaqueous electrolyte secondary batteries and a production method thereof.

Related Art

In recent years, with the wide adoption of portable electronic devices such as mobile phones and laptop computers, the development of small and lightweight nonaqueous electrolyte secondary batteries having high energy density is strongly desired. Further, the development of high power secondary batteries as batteries for electric cars including hybrid cars is strongly desired.

Examples of the secondary batteries satisfying such demands include lithium ion secondary batteries. Such lithium ion secondary batteries are composed of a negative electrode, a positive electrode, an electrolyte, etc., and materials capable of intercalation and deintercalation of lithium ions are used for the active materials of the negative electrode and the positive electrode.

The lithium ion secondary batteries are now being actively studied and developed. Above all, lithium ion secondary batteries using a layered or spinel lithium-metal composite oxide as a positive electrode material allow a high voltage of 4-V class to be obtained, and therefore are being put into practical use as batteries having high energy density.

Main examples of materials proposed so far include lithium cobalt composite oxide ($LiCoO_2$) that is comparatively easily synthesized, lithium nickel composite oxide ($LiNiO_2$) using nickel that is less expensive than cobalt, lithium nickel cobalt manganese composite oxide ($LiNi_{1/3}Co_{1/3}Mn_{1/3}O_2$), and lithium manganese composite oxide ($LiMn_2O_4$) using manganese.

Among these, lithium nickel composite oxide and lithium nickel cobalt manganese composite oxide are gaining attention as a material that allows good cycle characteristics as well as low resistance and high power to be obtained, and a resistance reduction that is necessary for power enhancement is regarded as being important in recent years.

As a method for achieving the aforementioned resistance reduction, addition of different elements is conducted, and transition metals capable of having high valence such as W, Mo, Nb, Ta, and Re are considered to be useful, in particular.

For example, Japanese Patent Laid-Open No. 2009-289726 proposes a lithium transition metal compound powder for lithium secondary battery positive electrode materials containing one or more elements selected from Mo, W, Nb, Ta, and Re in an amount of 0.1 to 5 mol % with respect to the total molar amount of Mn, Ni, and Co, where the total atomic ratio of Mo, W, Nb, Ta, and Re with respect to the total of Li and the metal elements other than Mo, W, Nb, Ta, and Re on the surface portions of primary particles is preferably 5 times or more the atomic ratio of the whole primary particles.

According to this proposal, the cost reduction, high safety, high load characteristics, and improvement in powder handleability of the lithium transition metal compound powder for lithium secondary battery positive electrode materials can be achieved all together.

However, the aforementioned lithium transition metal compound powder is obtained by pulverizing a raw material in a liquid medium, spray drying a slurry in which the pulverized materials are uniformly dispersed, and firing the obtained spray-dried material. Therefore, some of different elements such as Mo, W, Nb, Ta, and Re are substituted with Ni disposed in layers, resulting in a reduction in battery characteristics such as battery capacity and cycle characteristics, which has been a problem.

Further, Japanese Patent Laid-Open No. 2005-251716 proposes a positive electrode active material for nonaqueous electrolyte secondary batteries having at least a lithium transition metal composite oxide with a layered structure, wherein the lithium transition metal composite oxide is present in the form of particles composed of either or both of primary particles and secondary particles as aggregates of the primary particles, and wherein the particles have a compound including at least one selected from the group consisting of molybdenum, vanadium, tungsten, boron, and fluorine at least on the surface.

With that, it is claimed that the positive electrode active material for nonaqueous electrolyte secondary batteries having excellent battery characteristics even in more severe use environment is obtained, and that the initial characteristics are improved without impairing the improvement in thermostability, load characteristics, and output characteristics particularly by having the compound including at least one selected from the group consisting of molybdenum, vanadium, tungsten, boron, and fluorine on the surface of the particles.

However, the effect by adding the at least one element selected from the group consisting of molybdenum, vanadium, tungsten, boron, and fluorine is to improve the initial characteristics, that is, the initial discharge capacity and the initial efficiency, where the output characteristics are not mentioned. Further, according to the disclosed production method, the firing is performed while the additive element is mixed with a heat-treated hydroxide together with a lithium compound, and therefore the additive element is partially substituted with nickel disposed in layers to cause a reduction in battery characteristics, which has been a problem.

Further, Japanese Patent Laid-Open No. H11-16566 proposes a positive electrode active material in which the circumference of the positive electrode active material is coated with a metal containing at least one selected from Ti, Al, Sn, Bi, Cu, Si, Ga, W, Zr, B, and Mo and/or an intermetallic compound obtained by combining a plurality of these elements, and/or an oxide.

It is claimed that such coating can ensure the safety by absorbing oxygen gas, but there is no disclosure on the output characteristics. Further, the disclosed production method involves coating using a planetary ball mill, and such a coating method causes physical damage on the positive electrode active material, resulting in a reduction in battery characteristics.

Further, Japanese Patent Laid-Open No. 2010-40383 proposes a positive electrode active material heat-treated while a tungstate compound is deposited on composite oxide particles mainly composed of lithium nickelate and having a carbonate ion content of 0.15 weight % or less.

According to this proposal, since the tungstate compound or a decomposition product of the tungstate compound is present on the surface of the positive electrode active material, and the oxidation activity on the surface of the composite oxide particles during charge is suppressed, gas generation due to the decomposition of the nonaqueous electrolyte or the like can be suppressed, but there is no disclosure on the output characteristics.

Further, the disclosed production method is to deposit a solution in which a sulfuric acid compound, a nitric acid compound, a boric acid compound, or a phosphate compound serving as a deposition component is dissolved in a solvent together with the tungstate compound, on the composite oxide particles that are preferably heated to at least the boiling point of the solution in which the deposition component is dissolved, where the solvent is removed within a short time, and therefore the tungsten compound is not sufficiently dispersed on the surface of the composite oxide particles and is not uniformly deposited, which has been a problem.

Further, improvements in power enhancement by lithium nickel composite oxide have been made.

For example, Japanese Patent Laid-Open No. 2013-125732 proposes a positive electrode active material for nonaqueous electrolyte secondary batteries having fine particles containing lithium tungstate represented by any one of $Li_2WO_4$, $Li_4WO_5$, and $Li_6W_2O_9$ on the surface of a lithium-metal composite oxide composed of primary particles and secondary particles formed by aggregation of the primary particles, where high power is supposed to be obtained together with high capacity.

There are, however, more highly demanded power enhancement and capacity enhancement, and further enhancements are demanded. In addition, there is the following problem: a step of dispersing tungsten in lithium-metal composite oxide and a heat-treating step are required for forming fine particles containing lithium tungstate, thereby causing a reduction in productivity.

In view of such problems, it is an object of the present invention to provide a positive electrode active material for nonaqueous electrolyte secondary batteries, at high productivity, which allows further improved battery capacity and output characteristics to be obtained when used as a positive electrode of a battery.

SUMMARY

As a result of diligent studies on the powder characteristics of lithium-metal composite oxide used as a positive electrode active material for nonaqueous electrolyte secondary batteries and the effect thereof on the positive electrode resistance of the battery, for solving the aforementioned problems, the inventors have found that a compound containing tungsten and lithium can be formed on the surface of primary particles capable of contacting with an electrolyte, by adding and stirring a poorly soluble tungsten compound in water washing of a lithium-metal composite oxide powder, followed by solid-liquid separation and heat treatment. Further, they have found that a compound containing tungsten and lithium can be formed on the surface of primary particles to thereby reduce the positive electrode resistance of a battery and improve output characteristics, thereby accomplishing the present invention.

More specifically, the first aspect of the present invention is a method for producing a positive electrode active material for nonaqueous electrolyte secondary batteries, including: a mixing step of adding a tungsten compound powder having a solubility A adjusted to 2.0 g/L or less to a lithium-metal composite oxide powder and stirring them in water washing, the solubility A being determined by stirring the tungsten compound in water having a pH of 12.5 at 25° C. for 20 minutes, the lithium-metal composite oxide powder being represented by the general formula: $LicNi_{1-x-y}Co_xM_yO_2$ (where $0 \leq x \leq 0.35$, $0 \leq y \leq 0.35$, and $0.97 \leq c \leq 1.25$ are satisfied, and M is at least one element selected from Mn, V, Mg, Mo, Nb, Ti and Al) and composed of primary particles and secondary particles formed by aggregation of the primary particles, followed by solid-liquid separation, to thereby obtain a tungsten-containing mixture with the tungsten compound dispersed in the lithium-metal composite oxide powder; and a heat-treating step of heat-treating the tungsten-containing mixture obtained in the mixing step and thus uniformly dispersing tungsten on the surface of the primary particles of the lithium-metal composite oxide powder, and thereafter forming a compound containing tungsten and lithium from tungsten dispersed uniformly on the surface of the primary particles and lithium in the tungsten-containing mixture, on the surface of the primary particles of the lithium-metal composite oxide powder.

The second aspect of the present invention is the method for producing a positive electrode active material for nonaqueous electrolyte secondary batteries according to the first aspect, wherein the tungsten compound added in the mixing step is lithium tungstate.

The third aspect of the present invention is the method for producing a positive electrode active material for nonaqueous electrolyte secondary batteries according to the first and second aspects, wherein the heat treatment in the heat-treating step is performed at a temperature of 100 to 600° C. in an oxygen atmosphere or in a vacuum atmosphere.

The fourth aspect of the present invention is the method for producing a positive electrode active material for nonaqueous electrolyte secondary batteries according to the first to third aspects, wherein the amount of tungsten contained in the tungsten compound is 0.05 to 3.0 at % with respect to the total number of atoms of Ni, Co and M contained in the lithium-metal composite oxide powder mixed.

The fifth aspect of the present invention is the method for producing a positive electrode active material for nonaqueous electrolyte secondary batteries according to the first to fourth aspects, wherein the tungsten compound added in the mixing step includes 80% or more of $(Li_2WO_4)_7(H_2O)_4$.

The sixth aspect of the present invention is the method for producing a positive electrode active material for nonaqueous electrolyte secondary batteries according to the second aspect, wherein the lithium tungstate is obtained by a reaction of lithium hydroxide and a tungsten compound.

The seventh aspect of the present invention is the method for producing a positive electrode active material for nonaqueous electrolyte secondary batteries according to the first to sixth aspects, wherein the temperature in the water washing in the mixing step is 40° C. or less.

The eighth aspect of the present invention is a positive electrode active material for nonaqueous electrolyte secondary batteries, including a lithium-metal composite oxide represented by the general formula (1): $LiaNi_{1-x-y}Co_xM_yW_zO_{2+\alpha}$ (where $0 \leq x \leq 0.35$, $0 \leq y \leq 0.35$, $0.0005 \leq z \leq 0.030$, $0.97 \leq a \leq 1.25$, and $0 \leq \alpha \leq 0.20$ are satisfied, and M is at least one element selected from Mn, V, Mg, Mo, Nb, Ti and Al) and composed of primary particles and secondary particles formed by aggregation of the primary particles, wherein a compound containing lithium and tungsten is formed on the surface of the primary particles of the lithium-metal composite oxide, and when voids between the primary particles at any 20 or more points are EDX analyzed in transmission-type electron microscope observation of a cross section of the secondary particles, tungsten is detected at 50% or more of the number of the voids analyzed.

The ninth aspect of the present invention is the positive electrode active material for nonaqueous electrolyte secondary batteries according to the eighth aspect, wherein the compound containing lithium and tungsten is present on the surface of the primary particles of the lithium-metal composite oxide as coating thin film having a film thickness of 1 to 100 nm.

The tenth aspect of the present invention is the positive electrode active material for nonaqueous electrolyte secondary batteries according to the eighth and ninth aspects, wherein the compound containing lithium and tungsten is present on the surface of the primary particles of the lithium-metal composite oxide in both forms of thin film having a film thickness of 1 to 100 nm and fine particles having a particle size of 1 to 200 nm.

The eleventh aspect of the present invention is the positive electrode active material for nonaqueous electrolyte secondary batteries according to the eighth to tenth aspects, wherein the amount of tungsten contained in the compound containing lithium and tungsten is 0.08 to 3.0 at % in terms of the number of W atoms with respect to the total number of atoms of Ni, Co and M contained in the lithium-metal composite oxide.

The twelfth aspect of the present invention is the positive electrode active material for nonaqueous electrolyte secondary batteries according to the eighth to eleventh aspects, wherein the lithium-metal composite oxide is represented by the general formula (2): LibNi1-x-yCoxMyO2 (where $0 \leq x \leq 0.35$, $0 \leq y \leq 0.35$, and $0.95 \leq b \leq 1.20$ are satisfied, and M is at least one element selected from Mn, V, Mg, Mo, Nb, Ti and Al).

According to the present invention, a positive electrode active material for nonaqueous electrolyte secondary batteries, which is capable of achieving high power together with further improved high capacity when used as a positive electrode of a battery.

Further, the production method thereof is easy and can allow for production on an industrial scale at high productivity, and the industrial value thereof is exceptionally large.

DETAILED DESCRIPTION

Figure 1:
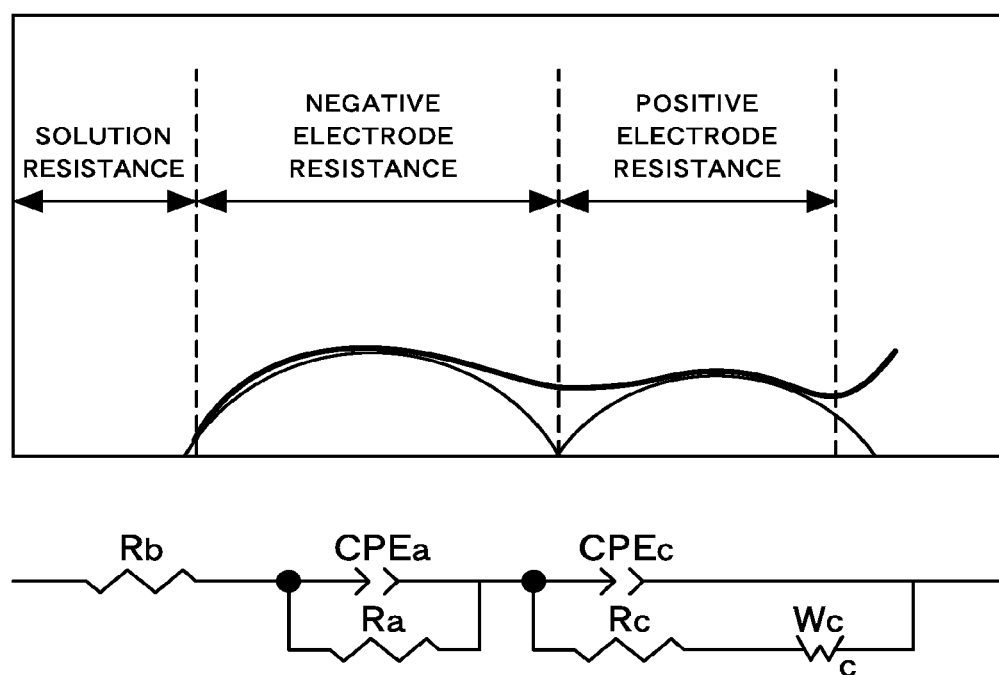
FIG. 1 is a schematic illustration of an equivalent circuit used for measurement examples of impedance evaluation and analysis.

Hereinafter, the present invention will be described. A positive electrode active material of the present invention will be first described, and thereafter a production method thereof will be described.

(1) Positive Electrode Active Material

The positive electrode active material for nonaqueous electrolyte secondary batteries obtained by the present invention is a positive electrode active material for nonaqueous electrolyte secondary batteries, including a lithium-metal composite oxide represented by the general formula (1): $Li_aNi_{1-x-y}Co_xM_yW_zO_{2+\alpha}$ (where $0 \leq x \leq 0.35$, $0 \leq y \leq 0.35$, $0.0005 \leq z \leq 0.030$, $0.97 \leq a \leq 1.25$, and $0 \leq \alpha 0.20$ are satisfied, and M is at least one element selected from Mn, V, Mg, Mo, Nb, Ti and Al) and composed of primary particles and secondary particles formed by aggregation of the primary particles, wherein a compound containing lithium and tungsten is formed on the surface of the primary particles of the lithium-metal composite oxide, and when voids between the primary particles forming secondary particles at any 20 or more points are EDX analyzed in transmission-type electron microscope observation of a cross section of the secondary particles, tungsten is detected at 50% or more of the number of the voids analyzed.

In the present invention, high charge-discharge capacity is obtained by using the lithium-metal composite oxide represented by the general formula (2) $Li_bNi_{1-x-y}Co_xM_yO_2$ (where $0 \leq x \leq 0.35$, $0 \leq y \leq 0.35$, and $0.95 \leq b \leq 1.20$ are satisfied, and M is at least one element selected from Mn, V, Mg, Mo, Nb, Ti, and Al) as a base material.

Further, the base material is in the form of a lithium-metal composite oxide composed of primary particles and secondary particles formed by aggregation of the primary particles (hereinafter, the secondary particles and the primary particles existing alone may be referred to collectively as "lithium-metal composite oxide particles"), and a compound containing lithium and tungsten formed on the surface of the primary particles (primary particle surface) allows battery performances such as battery capacity and output characteristics to be achieved at higher level.

Generally, when the surface of the positive electrode active material is here completely coated with a different compound, the movement (intercalation) of lithium ions is significantly limited, and therefore high capacity that is an advantage of lithium nickel composite oxide is eventually offset.

In contrast, in the positive electrode active material for nonaqueous electrolyte secondary batteries of the present invention (which will be hereinafter referred to simply as "positive electrode active material"), a compound containing lithium (Li) and tungsten (W) (which may be hereinafter referred to simply as "compound") is formed on the surface of the lithium-metal composite oxide particles, and the compound has high lithium ion conductivity and has an effect of promoting the movement of lithium ions. Therefore, the abovementioned compound is formed on the surface of the lithium-metal composite oxide particles, thereby forming Li conduction paths at the interface with the electrolyte, so that the reaction resistance of the positive electrode active material (which may be hereinafter referred to as "positive electrode resistance") is reduced to improve output characteristics.

More specifically, the reduction in positive electrode resistance reduces the voltage to be lost in the battery, and the voltage actually applied to the load side is relatively increased, thereby allowing high power to be obtained. Further, the increase in the voltage applied to the load side allows lithium to be sufficiently inserted into and removed from the positive electrode, and therefore battery capacity is also improved. Further, the reduction in reaction resistance can also reduce the load of the active material during charge-discharge to thereby improve cycle characteristics.

The compound contains Li and W, to thereby impart high Li ion conductivity and the effect of promoting the movement of Li ions, and 50% or more of W contained in the compound is preferably present in the form of $Li_4WO_5$.

More specifically, $Li_4WO_5$ has many Li ion conduction paths and has a high effect of promoting the movement of Li ions, as the compound containing Li and W, and therefore 50% or more of W is present in the form of $Li_4WO_5$, thereby allowing a higher effect of reducing the reaction resistance to be obtained.

The contact with the electrolyte occurs on the surface of the primary particles, and therefore it is important that the compound be formed on the surface of the primary particles.

Here, the surface of the primary particles in the present invention includes the surface of the primary particles exposed on the outer surface of the secondary particles, and the surface of the primary particles communicating with the outside of the secondary particles so as to allow the electrolyte to penetrate therethrough and exposed into voids in the vicinity of the surface of the secondary particles and inside thereof. Further, the surface of the primary particles in the present invention includes even the grain boundaries between the primary particles if the primary particles are not perfectly bonded and the electrolyte can penetrate therethrough.

More specifically, the contact of the compound with the electrolyte occurs not only on the outer surface of the secondary particles formed by aggregation of the primary particles, but also in the voids between the primary particles in the vicinity of the surface of the secondary particles and inside thereof and further at the imperfect grain boundaries between the primary particles forming the secondary particles, and therefore it is necessary to form the compound also on the surface of the primary particles to promote the movement of lithium ions.

Accordingly, the reaction resistance of the lithium-metal composite oxide particles can be further reduced by forming the compound more on the surface of the primary particles which can contact with the electrolyte.

In the positive electrode active material of the present invention, when voids between the primary particles at any 20 or more points present in the secondary particles, namely, the surface of the primary particles facing the voids are EDX analyzed in transmission-type electron microscope observation of a cross section of the secondary particles, tungsten is detected at 50% or more of the number of the voids analyzed, preferably 60% or more, more preferably 70% or more.

The tungsten on the surface of the primary particles is taken together with Li to easily form a compound, and it can be thus said that tungsten detection exhibits formation of a compound containing Li and W. Therefore, the compound is formed at sufficient positions on the surface of the primary particles which can contact with the electrolyte, thereby enabling higher battery performances to be achieved. If the number of voids where tungsten is detected is less than 50% with respect to the number of the voids analyzed, the surface of the primary particles, on which the compound is not formed, is increased, and therefore battery performances are not sufficiently enhanced.

Further, as the form of the compound on the surface of the primary particles, when the surface of the primary particles is coated with layered materials, the contact area with the electrolyte is reduced, and when such layered materials are formed, the formation of the compound tends to concentrate on the surface of some specific primary particles. Accordingly, since the layered materials as coating materials have high lithium ion conductivity, the effects of improving the charge-discharge capacity and reducing the reaction resistance are obtained, but they are not sufficient, leaving room for improvement Meanwhile, the surface of the primary particles is coated with a thin film, thereby enabling Li conduction paths to be formed at the interface with the electrolyte while the reduction in specific surface area is suppressed, and higher effects of improving the charge-discharge capacity and reducing the reaction resistance are obtained.

In the case where the surface of the primary particles is coated with such a compound in the form of thin films, the compound is preferably present on the surface of the primary particles of the lithium-metal composite oxide as thin films having a film thickness of 1 to 100 nm.

When the film thickness is less than 1 nm, the coating films may fail to have sufficient lithium ion conductivity in some cases. Further, when the film thickness is over 100 nm, the coating films are in the state of the layered materials, the contact area with the electrolyte is reduced, a higher effect of reducing the reaction resistance is not obtained in some cases, and also thin film formation on the surface of the primary particles is non-uniform in some cases.

Further, also in the case where the compound is formed on the surface of the primary particles in the form of fine particles as well as in the form of a coating thin film, a high effect on battery characteristics is obtained.

The compound in the form of fine particles is preferably present on the surface of the primary particles of the lithium-metal composite oxide, as fine particles having a particle size of 1 to 200 nm, for obtaining a higher effect of improving the battery characteristics.

The contact area with the electrolyte is rendered sufficient by having such a form, so that the lithium ion conduction can be effectively improved, thereby allowing the reaction resistance to be more effectively reduced and the charge-discharge capacity to be improved. When the particle size is less than 1 nm, the fine particles may fail to have sufficient lithium ion conductivity in some cases.

When the particle size is over 200 nm, however, the formation of the fine particles on the surface of the primary particles is made non-uniform, which may result in failure to obtain a higher effect of reducing the reaction resistance in some cases.

Not all which are present in the form of fine particles, however, are necessarily present as fine particles having a particle size of 1 to 200 nm, and a higher effect of improving the battery characteristics is obtained by interaction with a thin coating film when 50% or more of the number of the fine particles formed on the surface of the primary particles are preferably formed to have a particle size in the range of 1 to 200 nm.

Meanwhile, in the case where thin films and fine particles are non-uniformly formed between the secondary particles of the lithium-metal composite oxide, the movement of lithium ions between the secondary particles is rendered non-uniform, and therefore a load is applied onto some specific secondary particles, which tends to cause a deterioration in cycle characteristics and an increase in reaction resistance.

Accordingly, thin films and fine particles are preferably uniformly formed also between the secondary particles.

The amount of the compound formed can be controlled by the amount of tungsten contained in the compound, and tungsten is contained in the compound in an amount of 0.05 to 3.0 at % as the number of W atoms with respect to the total number of atoms of Ni, Co and M contained in the positive electrode active material, preferably 0.08 to 3.0 at %, more preferably 0.1 to 1.50 at %, further preferably 0.15 to 1.00 at %.

Thus, while the surface of the primary particles which can contact with the electrolyte is ensured, the compound can be formed in a sufficient amount and the reaction resistance of the positive electrode active material can be reduced. Further, even the inside of the secondary particles can efficiently contribute to charge-discharge, and therefore can also improve the battery capacity.

When tungsten is contained in the compound in an amount of less than 0.05 at % as the number of W atoms with respect to the total number of atoms of Ni, Co and M contained in the positive electrode active material, the amount of the compound formed is small and the reaction resistance of the positive electrode active material cannot be sufficiently reduced in some cases. Meanwhile, when tungsten is contained in an amount of more than 3.00 at %, the surface of the primary particles which can contact with the electrolyte is decreased and the charge-discharge efficiency inside the secondary particles is reduced, thereby reducing the effect of improving the battery capacity in some cases.

Next, the void content measured in cross-sectional observation of the secondary particles of the positive electrode active material of the present invention is preferably 0.15 to 3%, more preferably 0.15 to 1.5%, further preferably 0.15 to 0.5%. The voids are present in such a void content, thereby allowing the electrolyte to penetrate into the surface of the secondary particles, and enabling the surface of the primary particles which can contact with the electrolyte to be sufficiently ensured.

The surface of the primary particles which can contact with the electrolyte can also be controlled by the specific surface area, and the specific surface area of the positive electrode active material, measured by the BET method, is preferably 0.9 to 1.5 m2/g. Thus, while the surface of the primary particles which can contact with the electrolyte is controlled so as to have a proper area, thereby allowing the safety of the positive electrode active material to be ensured, high battery characteristics can be obtained.

Here, the void content can be measured by observing any cross section of the secondary particles with a scanning electron microscope (SEM), and performing image analysis.

For example, the void content can be determined as follows: a plurality of the secondary particles are embedded into a resin or the like, cross-section polishing or the like is performed thereon to enable the cross section of the particles to be observed, thereafter image analysis software: WinRoof 6.1.1 or the like; is used to adopt the secondary particles at any 20 or more points for the parameter and to define the void region in the secondary particles as a black region and the compact region in the profile of the secondary particles as a white region, the total of the regions is subjected to measurement to calculate the total area of the total number of the secondary particles, and the area ratio [black region area/(black region area+white region area)] is defined as the void content to calculate the void content.

The positive electrode active material of the present invention has improved battery characteristics by forming the compound containing W and Li on the surface of the primary particles constituting the lithium-metal composite oxide as a base material, to reduce the reaction resistance, and the powder characteristics as the positive electrode active material, such as particle size and tap density, may fall within the range of those of positive electrode active materials commonly used.

Further, the Li content in the compound containing Li and W more increases than the lithium content in the lithium-metal composite oxide, in the entire positive electrode active material.

Accordingly, with respect to the amount of lithium in the entire positive electrode active material, the ratio "Li/Me1" of the number of atoms of Li with respect to the sum (Me1) of the number of atoms of Ni, Co, and M in the positive electrode active material is 0.97 to 1.25, preferably 0.97 to 1.20. When the ratio Li/Me1 is less than 0.97, the reaction resistance of the positive electrode in the nonaqueous electrolyte secondary battery using the obtained positive electrode active material increases, and thus the output of the battery decreases. Further, when Li/Me1 is over 1.25, the discharge capacity of the positive electrode active material decreases and the reaction resistance of the positive electrode increases as well. The ratio "Li/Me1" is more preferably 0.97 to 1.20 for decreasing the reaction resistance and also increasing the discharge capacity to further improve battery characteristics.

Further, the ratio "Li/Me2" of the number of atoms of Li with respect to the sum (Me2) of the number of atoms of Ni, Co and M in the lithium-metal composite oxide is preferably 0.95 to 1.20, more preferably 0.97 to 1.15.

The ratio "Li/Me2" is set to 0.95 to 1.20, thereby enabling the ratio "Li/Me1" to be easily controlled within the range from 0.97 to 1.25. Further, the lithium-metal composite oxide is excellent in battery characteristics such as battery capacity and output characteristics.

The effect by attachment of the compound containing W and Li onto the surface of the primary particles of the lithium-metal composite oxide can be applied to, for example, lithium-cobalt composite oxide, lithium-manganese composite oxide and lithium-nickel-cobalt-manganese composite oxide powders, and further not only the positive electrode active material of the present invention, but also a positive electrode active material for lithium secondary batteries which is commonly used.

(2) Method for Producing Positive Electrode Active Material

Hereinafter, a method for producing the positive electrode active material for nonaqueous electrolyte secondary batteries of the present invention (which will be hereinafter referred to simply as "production method") will be described in detail for each step.

[Mixing Step]

The mixing step is a step of obtaining a tungsten-containing mixture (which will be hereinafter referred to simply as "mixture") formed by using, as a base material, a lithium-metal composite oxide represented by the general formula: $LiNi_{1-x-y}Co_xM_yO_2$ (where $0 \leq x \leq 0.35$, $0 \leq y \leq 0.35$, and $0.97 \leq c \leq 1.25$ are satisfied, and M is at least one element selected from Mn, V, Mg, Mo, Nb, Ti and Al) and composed of primary particles and secondary particles formed by aggregation of the primary particles, adding and stirring a tungsten compound powder having a solubility of 2.0 g/L or less as determined by stirring the tungsten compound in water having a pH of 12.5 at 25° C. for 20 minutes, in water washing a powder of the lithium-metal composite oxide, followed by solid-liquid separation, to thereby disperse a tungsten compound in the lithium-metal composite oxide powder. The lithium-metal composite oxide powder in the form of slurry in water washing (which may be hereinafter referred to simply as "slurry") and the tungsten compound powder can be stirred to thereby allow W to be uniformly dispersed in the lithium-metal composite oxide powder.

Meanwhile, in the case where the solid or solution of the tungsten compound is mixed with the lithium-metal composite oxide powder in the form of powder, the lithium-metal composite oxide in the form of powder less flows and has more difficulty in providing uniform dispersion of W than that in the form of slurry. Further, if mixing is performed for a long time for uniform dispersion, productivity is significantly reduced. Further, in the case where those in the form of solid (powder) low in water content are mixed, the tungsten compound insufficiently penetrates into the secondary particles of the lithium-metal composite oxide, and the power enhancement effect due to the formation of the compound also on the surface of the primary particles in the secondary particles is reduced.

While uniform dispersion can also be achieved by a method where the lithium-metal composite oxide powder is immersed in the solution of the tungsten compound to perform solid-liquid separation, tungsten dissolved during solid-liquid separation is lost as a waste liquid, or any facilities for large-scale liquid circulation are needed in the case of recover or reuse of such tungsten, thereby resulting in an increase in production cost.

In the mixing step, when the lithium-metal composite oxide powder is washed with water, the lithium-metal composite oxide powder in the form of slurry and the tungsten compound powder may be mixed by stirring. Accordingly, water and the lithium-metal composite oxide powder may be mixed to form a slurry and thereafter the tungsten compound powder may be added into and mixed with the slurry, or the lithium-metal composite oxide powder may be added to water to which the tungsten compound powder is added in advance, and thereafter stirred and mixed in the form of slurry. The stirring method may be a common stirring method, and stirring is preferably made at a speed that allows any powder not to be precipitated such that the powder is uniformly dispersed.

In the production method of the present invention, a tungsten compound powder having a solubility A of 2.0 g/L or less is used when the solubility A is determined by stirring for 20 minutes in water having a pH of 12.5 at a water temperature of 25° C. in water washing. This allows the stirring in water washing to uniformly mix the lithium-metal composite oxide powder and the tungsten compound powder. When the solubility A is over 2.0 g/L, tungsten dissolved into the liquid component of the slurry increases, and there is caused the same problem as that of the above method where the lithium-metal composite oxide powder is immersed in the solution of the tungsten compound to perform solid-liquid separation.

Accordingly, for obtaining the effect of reducing the reaction resistance by the formation of the compound on the surface of the primary particles of the lithium-metal composite oxide powder, a large amount of the tungsten compound powder is needed to be added, thereby resulting in a significant increase in cost.

The solubility A is defined as the solubility in stirring in water having a pH of 12.5 at a water temperature of 25° C. for 20 minutes. For example, 1 g of the tungsten compound powder is added to 100 ml of water having a pH of 12.5 at 25° C., and then stirred for 20 minutes. After the stirring, the amount of the tungsten compound powder dissolved can be calculated from the analysis value of the tungsten content in water, thereby determining the solubility.

The water temperature and the pH value here are preferably controlled within a variation of ±0.5° C. from 25° C. as the center value for water temperature and within a variation of ±0.2 from 12.5 as the center value for pH value to produce no variation in solubility measurement. The pH value is here preferably controlled by adjustment with sodium hydroxide, potassium hydroxide, lithium hydroxide, or the like. The slurry in the mixing step has a higher pH value as a result of dissolution of lithium from the lithium-metal composite oxide powder, and therefore lithium hydroxide is more preferably used in control of the pH value at the solubility A.

The tungsten compound powder may be any tungsten compound powder as long as it has a solubility A of 2.0 g/L or less, but, as the tungsten compound, tungsten oxide, lithium tungstate, ammonium tungstate, sodium tungstate, and the like are preferable, tungsten oxide, lithium tungstate, and ammonium tungstate with a low possibility of contamination are more preferable, and tungsten oxide and lithium tungstate are further preferable. In particular, lithium tungstate is preferable for ensuring the amount of lithium in the compound to enhance the lithium ion conductivity of the compound, and a tungsten compound powder including 80% or more of $(Li_2WO_4)7(H_2O)4$ is more preferably used in terms of solubility.

The production method of the lithium tungstate is not specifically limited, and a method where lithium hydroxide and the tungsten compound are reacted to provide the lithium tungstate is easy and preferable.

The solubility A is affected also by the particle size of the tungsten compound powder. More specifically, a tungsten compound powder having a small particle size tends to be increased in the solubility A, and a tungsten compound powder having a large particle size tends to be decreased in the solubility A.

Accordingly, the particle size is preferably adjusted such that the solubility A is 2.0 g/L or less, and the particle size is more preferably adjusted such that the solubility A is 1.5 g/L or less.

In the case where the tungsten compound powder has secondary particles formed by aggregation of primary particles, and aggregated particles formed by aggregation of the secondary particles, the particle size of the primary particles has a large effect on the solubility and therefore the particle size of the primary particles is more preferably adjusted.

More specifically, the secondary particles and the aggregate are partially dissolved in water washing, and thus dispersed in a state of being close to the primary particles.

The lower limit of the solubility A may be 0 g/L, namely, even a tungsten compound powder not dissolved at all can also be used because of being dissolved during heat treatment as described below, but the solubility A is preferably 0.1 g/L or more, more preferably 0.5 g/L or more for allowing tungsten to be dispersed into the secondary particles.

Further, the solubility B in water washing, at a water temperature increased from 25° C. to 50° C., is preferably over 2.0 g/L, more preferably over 3.0 g/L from the viewpoint that the tungsten compound is sufficiently dissolved due to the temperature rise during heat treatment and is allowed to penetrate into the surface of the primary particles inside the secondary particles.

Such a tungsten compound increased in solubility due to the temperature rise can be used to thereby allow tungsten to be uniformly dispersed in the lithium-metal composite oxide powder.

The average particle size as the particle size of the primary particles in the tungsten compound powder is preferably 0.2 to 5 μm, preferably 0.3 to 3 μm.

When the average particle size is less than 0.2 μm, the solubility A is over 2.0 g/L in some cases. Meanwhile, when the average particle size is over 5 μm, the tungsten compound powder, even if macroscopically uniformly dispersed in the mixture obtained by solid-liquid separation after water washing, is microscopically non-uniformly dispersed in terms of particles forming the lithium-metal composite oxide in some cases. Further, when the average particle size is over 5 μm, partial dissolution in water washing is also decreased.

The amount of tungsten contained in the mixture corresponds to the amount of tungsten in the positive electrode active material, and therefore is preferably adjusted to 0.05 to 3.0 at % with respect to the total number (Me) of atoms of nickel, cobalt and M contained in the lithium-metal composite oxide mixed.

Further, in the production method of the present invention, solid-liquid separation is performed after water washing, and therefore tungsten dissolved in the slurry, excluding the liquid component contained in the mixture, is discharged. The amount of tungsten dissolved in the slurry corresponds to the amount which is stable depending on the slurry temperature, stirring conditions, and the tungsten compound powder used, and therefore the amount of tungsten in the mixture can be easily adjusted within the above range by determining in advance the amount of tungsten dissolved and the water content after solid-liquid separation by a preliminary test or the like.

The temperature for water washing, namely, the slurry temperature is preferably set to 40° C. or less, more preferably 35° C. or less.

Since the tungsten compound powder is also increased in solubility in accordance with an increase in slurry temperature, the slurry temperature can be set to 40° C. or less, thereby inhibiting the tungsten compound powder from being excessively dissolved in the slurry.

The lower limit of the slurry temperature is not specifically limited, and may be a temperature at which the effect of removing excess lithium present on the surface of the lithium-metal composite oxide powder by washing is obtained, and the slurry temperature is preferably set to 10° C. or more, more preferably 15° C. or more.

The slurry concentration in water washing, in terms of the solid-liquid ratio, namely, the amount of the lithium-metal composite oxide powder with respect to 1 L of water, is preferably set to 200 to 5000 g, more preferably 500 to 1500 g.

The solid-liquid ratio falls within the above range, thereby inhibiting lithium from being excessively dissolved from the lithium-metal composite oxide powder and also allowing the pH value of the slurry to fall within a proper range, and thus the tungsten compound powder can be inhibited from being excessively dissolved. Further, the pH value of the slurry is preferably set to 11.5 to 13.5.

In the production method of the present invention, the lithium-metal composite oxide powder as a base material is washed with water and thus lithium is dissolved in the slurry in water washing. Accordingly, the amount decreased from Li/Me before water washing may be confirmed by a preliminary test to determine the Li/Me2 after water washing (which corresponds to b in the general formula (2)) in advance, and a lithium-metal composite oxide powder whose Li/Me is adjusted may be used as a material before water washing.

The amount of the Li/Me to be decreased under common water washing conditions is about 0.03 to 0.08.

Accordingly, as the lithium-metal composite oxide before water washing, a known lithium-metal composite oxide represented by the general formula: $LicNi1-x-yCoxMyO2$ (where $0 \leq x \leq 0.35$, $0 \leq y \leq 0.35$, and $0.97 \leq c \leq 1.25$ are satisfied, and M is at least one element selected from Mn, V, Mg, Mo, Nb, Ti and Al) is used in terms of high capacity and low reaction resistance.

Further, since it is advantageous to increase the contact area with the electrolyte for improving the output characteristics, it is preferable to use a lithium-metal composite oxide powder composed of primary particles and secondary particles formed by aggregation of the primary particles and to have voids and grain boundaries through which the electrolyte can penetrate in the secondary particles.

[Heat-Treating Step]

The heat-treating step is a step of heat-treating the mixture obtained in the mixing step, thereby allowing tungsten (W) to be uniformly dispersed on the surface of the primary particles of the lithium-metal composite oxide powder, and further forming the compound containing tungsten and lithium from the tungsten and lithium (Li) in the mixture, on the surface of the primary particles of the lithium-metal composite oxide.

Thus, the compound containing W and Li is formed from W supplied from the tungsten compound in the mixture, Li in the mixture, and also Li in the tungsten compound in the case of use of a tungsten compound containing Li, thereby providing a positive electrode active material for nonaqueous electrolyte secondary batteries including the compound containing W and Li on the surface of the primary particles of the lithium-metal composite oxide.

The lithium-metal composite oxide powder is washed with water to thereby allow excess lithium to be dissolved. Therefore, water contained in the mixture includes lithium dissolved in water washing.

Further, when the compound containing W and Li is formed, the compound is formed also by a reaction with excess lithium not dissolved and Li in the crystal of a part of the lithium-metal composite oxide.

Accordingly, Li in the mixture includes lithium dissolved in water washing and contained in water in the mixture, excess lithium not dissolved, and Li in the crystal of the lithium-metal composite oxide.

Any conditions may be adopted as the heat treatment conditions as long as such conditions allow the mixture to be dried and also the compound containing W and Li to be formed, but the heat treatment is preferably performed at a temperature of 100 to 600° C. in an oxygen atmosphere or a vacuum atmosphere for preventing the deterioration in electrical properties in use as a positive electrode active material for nonaqueous electrolyte secondary batteries. Further, the tungsten compound powder in the mixture is dissolved in water contained in the mixture by heating in the heat treatment, and thus W can be uniformly dispersed in the surface of the primary particles of the lithium-metal composite oxide, namely, not only the surface of the secondary particles, but also voids in the vicinity of the surface of the secondary particles and inside the secondary particles, and also the imperfect grain boundaries.

When the heat treatment temperature is less than 100° C., water is not sufficiently evaporated, which may result in failure to sufficiently form the compound. Further, the tungsten compound powder may also be insufficiently dissolved to reduce the penetration of W inside the secondary particles.

Meanwhile, when the heat treatment temperature exceeds 600° C., the primary particles of the lithium-metal composite oxide are fired, and W partially forms a solid solution in the layered structure of the lithium-metal composite oxide, which may reduce the charge-discharge capacity of the battery.

Further, the rate of temperature increase is preferably set to 0.8 to 1.2° C./minute, until the tungsten compound contained in the mixture is sufficiently dissolved, for example, until the temperature exceeds 90° C.

Setting the rate of temperature increase as above allows the tungsten compound to be sufficiently dissolved during the temperature rise so as to penetrate into the surface of the primary particles inside the secondary particles.

The atmosphere in the heat treatment is preferably an atmosphere subjected to decarburization treatment, preferably an oxidizing atmosphere such as an oxygen atmosphere or a vacuum atmosphere, for avoiding a reaction with water and carbonic acid in the atmosphere.

The heat treatment time is not specifically limited but is preferably 5 to 15 hours for sufficiently evaporating the water to form the compound while allowing W to penetrate inside the secondary particles in the mixture.

(3) Nonaqueous Electrolyte Secondary Battery

The nonaqueous electrolyte secondary battery provided by the present invention is constituted by a positive electrode, a negative electrode, a nonaqueous electrolyte, etc., and constituted by the same components as those of common nonaqueous electrolyte secondary batteries. The embodiment described below is just an example, and the nonaqueous electrolyte secondary battery of the present invention can be implemented by employing embodiments in which various changes and improvements are made, using the embodiment shown in this description as a base, based on the knowledge of those skilled in the art. Further, the applications of the nonaqueous electrolyte secondary battery of the present invention are not specifically limited.

(a) Positive Electrode

Using the positive electrode active material for nonaqueous electrolyte secondary batteries described above, the positive electrode of the nonaqueous electrolyte secondary battery is produced, for example, as follows.

First, a positive electrode active material in powder form, a conductive material, and a binder are mixed, and activated carbon and a solvent for its intended purpose such as a viscosity adjuster are further added, as needed, and the mixture is kneaded to produce a positive electrode composite material paste.

The mixing ratio of each component in the positive electrode composite material paste is also an important element to determine the performance of the nonaqueous electrolyte secondary battery. When the total mass of the solid contents of the positive electrode composite material excluding the solvent is taken as 100 parts by mass, it is desirable that the content of the positive electrode active material be 60 to 95 parts by mass, the content of the conductive material be 1 to 20 parts by mass, and the content of the binder be 1 to 20 parts by mass, as in a positive electrode of a common nonaqueous electrolyte secondary battery.

The obtained positive electrode composite material paste, for example, is applied to the surface of a current collector made of aluminum foil, followed by drying, to disperse the solvent. In order to enhance the electrode density, it may be pressed by roll pressing or the like, as needed. Thus, a positive electrode in sheet form can be produced.

The positive electrode in sheet form can be used for producing a battery, for example, by being cut into a suitable size corresponding to the intended battery. However, the method for producing the positive electrode is not limited to the aforementioned example, and another method may be employed.

For producing the positive electrode, graphite (such as natural graphite, artificial graphite, and expanded graphite) and carbon black materials such as acetylene black and Ketjen black (R), for example, can be used as the conductive material.

The binder serves to hold the active material particles, for which polyvinylidene fluoride (PVDF), polytetrafluoroethylene (PTFE), fluororubber, ethylene propylene diene rubber, styrene butadiene, cellulose resins, and polyacrylic acid, for example, can be used.

As needed, the positive electrode active material, the conductive material, and the activated carbon are dispersed, and a solvent to dissolve the binder is added to the positive electrode composite material. Specifically, an organic solvent such as N-methyl-2-pyrrolidone can be used as the solvent. Further, activated carbon can be added to the positive electrode composite material for an increase in electric double layer capacity.

(b) Negative Electrode

As the negative electrode, a material formed by applying a negative electrode composite material formed into a paste by mixing the binder with metal lithium, lithium alloy, or the like, or a negative electrode active material capable of absorbing and desorbing lithium ions and adding a suitable solvent onto the surface of the current collector made of a metal foil such as copper, followed by drying and compressing for increasing the electrode density, as needed, is used.

As the negative electrode active material, a powder material of natural graphite, artificial graphite, a fired material of an organic compound such as a phenolic resin, and a carbon material such as cokes, for example, can be used.

In this case, a fluorine-containing resin such as PVDF can be used as the negative electrode binder, as in the positive electrode, and an organic solvent such as N-methyl-2-pyrrolidone can be used as the solvent to disperse the active material and the binder therein.

(c) Separator

A separator is interposed between the positive electrode and the negative electrode. The separator separates the positive electrode and the negative electrode from each other and holds the electrolyte. A thin film of polyethylene, polypropylene, or the like having a large number of fine holes can be used as the separator.

(d) Non-Aqueous Electrolyte

The nonaqueous electrolyte is formed by dissolving a lithium salt as a supporting salt in an organic solvent.

As the organic solvent used, one selected from cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butanesulton, and phosphorus compounds such as triethyl phosphate and trioctyl phosphate can be used alone, or two or more of these can be mixed for use.

Further, as the supporting salt, LiPF6, LiBF4, LiClO4, LiAsF6, and LiN(CF3S02)2, and composite salts of these can be used.

Further, the non-aqueous electrolyte may contain a radical scavenger, a surfactant, a flame retardant, and the like.

(e) Shape and Configuration of Battery

The nonaqueous electrolyte secondary battery of the present invention constituted by the positive electrode, the negative electrode described above, the separator, and the non-aqueous electrolyte described above can have various shapes such as a cylindrical type and a stacked type.

Even if any shape is employed, an electrode body is obtained by stacking the positive electrode and the negative electrode via the separator, the obtained electrode body is impregnated with the non-aqueous electrolyte, the connection between the positive electrode current collector and the positive electrode terminal connected to the outside and the connection between the negative electrode current collector and the negative electrode terminal connected to the outside are established using leads for the current collectors, and the components are sealed in a battery case, to complete the nonaqueous electrolyte secondary battery.

(f) Characteristics

The nonaqueous electrolyte secondary battery using the positive electrode active material of the present invention has high capacity and high power.

In particular, the nonaqueous electrolyte secondary battery obtained by a further preferable embodiment using the positive electrode active material according to the present invention, for example, when used as a positive electrode of a 2032-type coin battery, has a high initial discharge capacity of 165 mAh/g or more and a low positive electrode resistance and further has high capacity and high power. Further, it also has high thermostability and excellent safety.

Here, the method for measuring the positive electrode resistance in the present invention is exemplified as follows.

When the frequency dependence of a battery reaction is measured by a common AC impedance method as an electrochemical evaluation technique, a Nyquist diagram based on the solution resistance, the negative electrode resistance and the negative electrode capacity, and the positive electrode resistance and the positive electrode capacity is obtained as shown in FIG. 1.

The battery reaction in an electrode is made by the resistance components following charge transfers and the capacity components by an electric double layer. When these components are shown as an electrical circuit, a parallel circuit of the resistance and the capacity is obtained, and they are shown as an equivalent circuit in which the solution resistance and the parallel circuit of the negative electrode and the positive electrode are connected in series as the entire battery.

The Nyquist diagram determined is subjected to fitting calculation using the equivalent circuit, and the resistance components and the capacity components each can be estimated.

The positive electrode resistance is equal to the diameter of a semicircle on the low frequency side of the Nyquist diagram to be obtained.

From above, the positive electrode resistance can be estimated by performing the AC impedance measurement on the produced positive electrode and subjecting the obtained Nyquist diagram to fitting calculation using the equivalent circuit.

EXAMPLES

A secondary battery having a positive electrode using the positive electrode active material obtained by the present invention was produced, and the performance (initial discharge capacity and positive electrode resistance) was measured to thereby also evaluate the positive electrode active material according to the present invention, in combination.

Hereinafter, the present invention will be specifically described by way of examples, but the present invention is not limited to these examples at all.

(Production and Evaluation of Battery)

For evaluating the positive electrode active material, a 2032-type coin battery 1 (which will be hereinafter referred to as coin type battery) shown in FIG. 4 was used.

Figure 4:
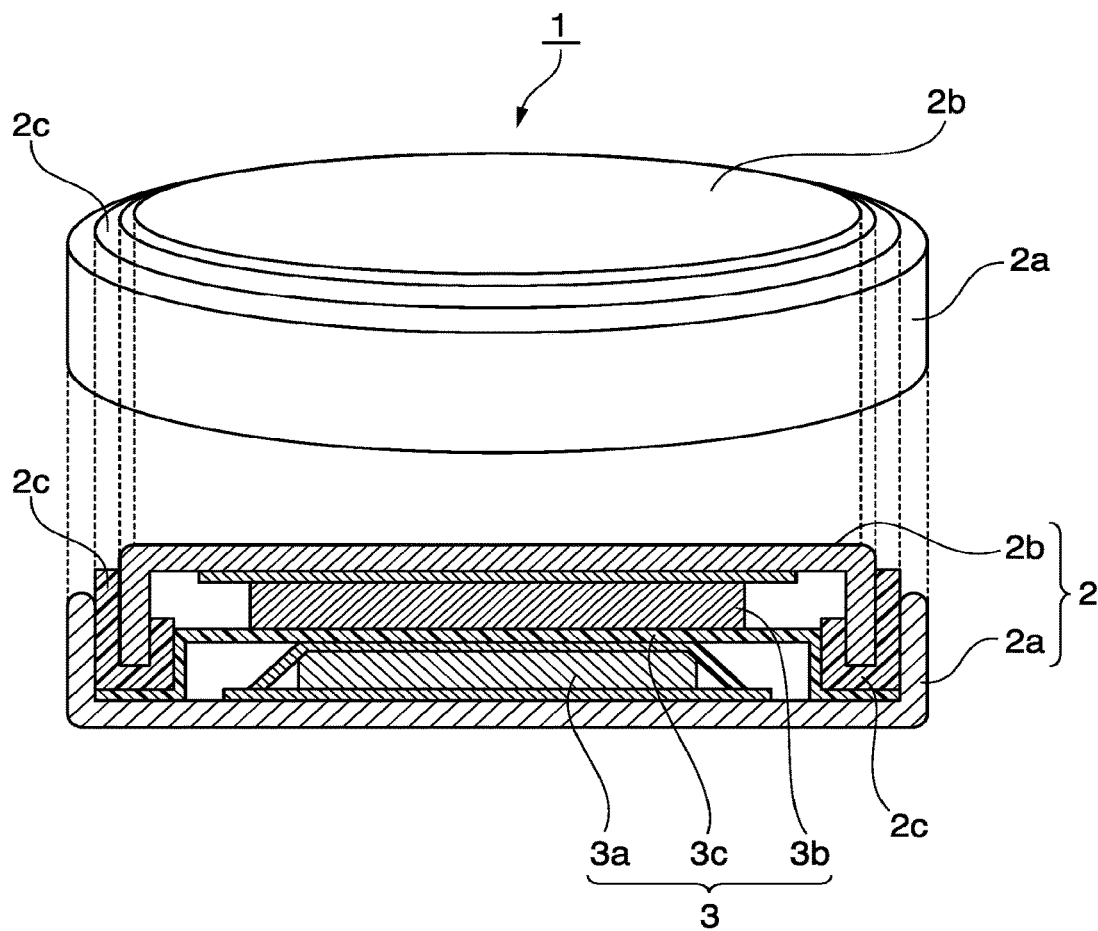
FIG. 4 is a schematic sectional view of a 2032-type coin battery 1 used for battery evaluation.

As shown in FIG. 4, the coin type battery 1 is constituted by a case 2 and electrodes 3 housed in the case 2.

The case 2 has a hollow positive electrode can 2a with one end open and a negative electrode can 2b arranged in the opening of the positive electrode can 2a, and is configured so that, when the negative electrode can 2b is arranged in the opening of the positive electrode can 2a, a space to house the electrodes 3 is formed between the negative electrode can 2b and the positive electrode can 2a.

The electrodes 3 are constituted by a positive electrode 3a, a separator 3c, and a negative electrode 3b, which are stacked to be aligned in this order and are housed in the case 2 so that the positive electrode 3a is in contact with the inner surface of the positive electrode can 2a, and the negative electrode 3b is in contact with the inner surface of the negative electrode can 2b.

The case 2 includes a gasket 2c, and the relative movement between the positive electrode can 2a and the negative electrode can 2b is fixed by the gasket 2c so that the non-contact state is maintained. Further, the gasket 2c also has a function of sealing the gap between the positive electrode can 2a and the negative electrode can 2b so as to block between the inside and the outside of the case 2 air-tightly and liquid-tightly.

The coin type battery 1 shown in FIG. 4 was fabricated as follows.

First, 52.5 mg of the positive electrode active material for nonaqueous electrolyte secondary batteries, 15 mg of acetylene black, and 7.5 mg of polytetrafluoroethylene resin (PTFE) were mixed, followed by press molding at a pressure of 100 MPa to a diameter of 11 mm and a thickness of 100 μm, to produce the positive electrode 3a. The thus produced positive electrode 3a was dried in a vacuum dryer at 120° C. for 12 hours.

Using the positive electrode 3a, the negative electrode 3b, the separator 3c, and the electrolyte, the coin type battery 1 described above was produced in a glove box under Ar atmosphere with the dew point controlled to −80° C.

As the negative electrode 3b, a negative electrode sheet in which graphite powder with an average particle size of about 20 μm and polyvinylidene fluoride were applied to a copper foil and which was punched into a disk shape with a diameter of 14 mm was used.

As the separator 3c, a polyethylene porous film with a film thickness of 25 μm was used. As the electrolyte, an equal mixture (manufactured by TOMIYAMA PURE CHEMICAL INDUSTRIES, LTD.) of ethylene carbonate (EC) and diethyl carbonate (DEC) with 1 M LiClO4 serving as a supporting electrolyte was used.

The initial discharge capacity and the positive electrode resistance showing the performance of the thus produced coin type battery 1 were measured and evaluated as follows.

The capacity when the coin type battery 1 allowed to stand for about 24 hours from the fabrication was charged, with the current density with respect to the positive electrode set to 0.1 mA/cm2, to a cut-off voltage of 4.3 V after the OCV (Open Circuit Voltage) became stable, followed by a pause for one hour, and was discharged to a cut-off voltage of 3.0 V was taken as the initial discharge capacity.

Further, the Nyquist plot shown in FIG. 1 is obtained by charging the coin type battery 1 at a charge potential of 4.1 V and measuring the positive electrode resistance using a frequency response analyzer and a potentio-galvanostat (1255B, manufactured by Solartron) by the AC impedance method.

Since the Nyquist plot is shown as the sum of characteristic curves showing the solution resistance, the negative electrode resistance and the capacity thereof, and the positive electrode resistance and the capacity thereof, fitting calculation was performed based on the Nyquist plot using the equivalent circuit to calculate the value of the positive electrode resistance.

In the present examples, the positive electrode active material, and the secondary battery, the respective samples of special reagents manufactured by Wako Pure Chemical Industries, Ltd. were used for producing the composite hydroxide.

Example 1

A powder of lithium-metal composite oxide represented by $Li_{1.03}Ni_{0.82}Co_{0.15}Al_{0.03}O_2$ and obtained by a known technique of mixing an oxide powder containing Ni as a main component and lithium hydroxide followed by firing was used as a raw material.

More specifically, nickel sulfate, cobalt sulfate and sodium aluminate were dissolved in water, a sodium hydroxide solution was further added with sufficient stirring, to produce a co-precipitate, i.e. a nickel-cobalt-aluminum composite hydroxide co-precipitate so that the molar ratio of Ni, Co and Al satisfied Ni:Co:Al=82:15:3, the co-precipitate was washed with water and dried, and thereafter lithium hydroxide-monohydrate was added to adjust the molar ratio so that Li:(Ni+Co+Al)=103:100 was satisfied, thereby producing a precursor.

Next, the precursor was fired in an oxygen stream at 700° C. for 10 hours, cooled to room temperature, and thereafter pulverized to obtain a powder of lithium-metal composite oxide made of lithium nickelate represented by the compositional formula: $Li_{1.03}Ni_{0.82}Co_{0.15}Al_{0.03}O_2$.

The lithium-metal composite oxide powder had an average particle size of 12.4 µm and a specific surface area of 0.3 m2/g. The average particle size was evaluated using a volume integrated average in the laser diffraction light-scattering method, and the specific surface area was evaluated using the BET method by nitrogen gas adsorption.

Next, a lithium tungstate powder to be mixed with the lithium-metal composite oxide powder was produced.

Lithium hydroxide/monohydrate (LiOH/H2O) and tungsten oxide (WO3) were mixed and reacted so that the molar ratio was 2:1. After completion of the reaction, the mixture was dried at 80° C. in the air atmosphere, to obtain a lithium tungstate powder.

After 1 g of the obtained lithium tungstate was added to 100 ml of water having a pH of 12.5 at 25° C., and the resultant was stirred for 20 minutes. After the stirring, solid-liquid separation was conducted by filtration to remove the residue, and analysis by ICP emission spectroscopy was conducted to determine the content of tungsten in the filtrate. The amount of lithium tungstate dissolved was calculated from the analysis value to determine the solubility A, and the solubility A was 1.2 g/L.

Hydrochloric acid was added to the filtrate after solid-liquid separation while measuring the pH until the point of neutralization emerged. When the state of a compound of lithium dissolved at the neutralization point was evaluated, 90 mol % or more of the lithium tungstate was confirmed to correspond to $Li_2WO_4$.

Further, the crystal structure of the obtained lithium tungstate powder was analyzed by the X-ray diffraction method (XRD), and the obtained lithium tungstate powder was concluded to correspond to $(Li_2WO_4)7(H_2O)4$.

75 g of a lithium-metal composite oxide powder as a raw material was immersed in 100 ml of pure water, and 0.29 g of the produced lithium tungstate powder was added and stirred to be thus sufficient mixed, and the lithium-metal composite oxide powder was washed with water at the same time. The concentration of the slurry which was washed with water, corresponding to the solid-liquid ratio at the time of addition of W, was 750 g/L. After water washing, solid-liquid separation was performed thereon by filtration using a Buchner funnel, to obtain a mixture of the tungsten compound powder and the lithium-metal composite oxide powder.

The obtained mixture was put into a firing container made of SUS, the temperature was raised in a vacuum atmosphere at a rate of temperature increase of 2.8° C./minute up to 210° C., for heat treatment at 210° C. for 13 hours, followed by cooling to room temperature in the furnace.

After cooling in the furnace, finally, a sieve with a mesh opening of 38 µm was applied for deagglomeration, to obtain a positive electrode active material having a compound containing W and Li on the surface of the primary particles.

As a result of analyzing the tungsten content and the ratio Li/Me1 in the obtained positive electrode active material by the ICP method, the composition was confirmed to be such that the tungsten content was 0.5 at % with respect to the total number of atoms of Ni, Co, and M (Me1), and the Li/Me1 was 0.994.

[Morphological Analysis of Compound Containing Lithium and Tungsten]

The obtained positive electrode active material was embedded into a resin, and processing was performed thereon so that cross section observation could be performed. The cross section of the resultant was observed by SEM at 5000-fold magnification, and it was confirmed that the resultant was composed of primary particles and secondary particles formed by aggregation of the primary particles, and fine particles of the compound containing lithium and tungsten were formed on the surface of the primary particles, and the fine particles had a particle size of 20 to 150 nm. Further, the void content of the secondary particles based on the above image analysis, determined by the observation, was 0.51%.

Further, the obtained positive electrode active material was embedded into a resin so that the cross section of the secondary particles could be observed by a transmission electron microscope (TEM). Thereafter, the cross section of the secondary particles was observed by TEM and voids between the primary particles at 25 points present in the secondary particles was analyzed by EDX, and as a result, W was detected at 84% of the number of the voids analyzed.

Further, the vicinity of the surface of the primary particles was observed by TEM, and it was confirmed that a coating thin film of the compound containing lithium and tungsten with a film thickness of 2 to 85 nm was formed on the surface of the primary particles, and the compound was lithium tungstate.

Further, the state of lithium tungstate in the obtained positive electrode active material was evaluated by titrating Li eluted from the positive electrode active material.

Pure water was added to the obtained positive electrode active material, the resultant mixture was stirred for a certain time. Hydrochloric acid was added to the filtrate while measuring the pH of the filtrate obtained by filtration until the point of neutralization emerged. When the state of a compound containing lithium eluted at the neutralization point was evaluated, the presence of Li4WO5 and Li2WO4 was confirmed in the lithium tungstate, and the proportion of Li4WO5 contained therein, as calculated, was 83 mol %.

[Evaluation of Battery]

The battery characteristics of the coin type battery 1 shown in FIG. 4 having a positive electrode produced using the obtained positive electrode active material were evaluated. The positive electrode resistance was shown as a relative value, taking the evaluation value of Example 1 as 100.

The initial discharge capacity was 204.6 mAh/g.

Hereinafter, for Examples 2 to 3 and Comparative Examples 1 to 2, only materials and conditions changed from those in Example 1 above are shown. Further, the evaluation values of the initial discharge capacity and the positive electrode resistance of Examples 1 to 3 and Comparative Examples 1 to 2 are shown in Table 1

Example 2

A positive electrode active material for nonaqueous electrolyte secondary batteries was obtained and also evaluated in the same conditions as in Example 1 except that 0.12 g of lithium tungstate was added. The results are shown in Table 1.

Example 3

A positive electrode active material for nonaqueous electrolyte secondary batteries was obtained and also evaluated in the same conditions as in Example 1 except that 0.35 g of lithium tungstate was added. The results are shown in Table 1.

Comparative Example 1

1.4 g of WO3 was added into an aqueous solution in which 0.6 g of LiOH was dissolved in 5 ml of pure water, followed by stirring, to obtain an alkaline solution (W) containing tungsten.

A positive electrode active material for nonaqueous electrolyte secondary batteries was obtained and also evaluated in the same conditions as in Example 1 except that no lithium tungstate was added in water washing and the alkaline solution (W) was added and mixed after solid-liquid separation. The results are shown in Table 1. The amount of a liquid in addition of W (addition of the alkaline solution) was defined as the total of water remaining after solid-liquid separation and the alkaline solution, and the solid-liquid ratio was calculated.

Comparative Example 2

A positive electrode active material for nonaqueous electrolyte secondary batteries was obtained and also evaluated in the same conditions as in Example 1 except that no lithium tungstate was added in water washing and water washing was performed by pure water. The results are shown in Table 1.

Conventional Example 1.632 parts by weight of ammonium paratungstate ((NH4)10W12O41.5H2O) was added to 100 parts by weight of the lithium-metal composite oxide powder used in Example 1, and sufficiently mixed in a mortar to provide a mixture, and the mixture was fired in an oxygen stream at 700° C. for 4 hours and cooled to room temperature, and thereafter taken out and pulverized, to produce a positive electrode active material of Conventional Example.

The obtained positive electrode active material was used, and evaluated as in Example 1. The results are shown in Table 1.

TABLE 1

|  | W concentration | | | Compound on surface of primary particles | | | | | |
| --- | --- | --- | --- | --- | --- | --- | --- | --- | --- |
|  | in positive electrode active material [at %] | Solid-liquid ratio in addition of W [g/L] | Heat treatment conditions | Number of voids with W detected [%] | Form | Particle size [nm] | Film thickness [nm] | Initial discharge capacity [mAh/g] | Positive electrode resistance |
| Example 1 | 0.5 | 750 | 210° C. × 13 hr | 84 | Thin film + fine particles | 20-150 | 2-85 | 204.6 | 100 |
| Example 2 | 0.2 | 750 | 210° C. × 13 hr | 72 | Thin film | — | 1-80 | 205.5 | 116 |
| Example 3 | 0.6 | 750 | 210° C. × 13 hr | 88 | Thin film + fine particles | 30-170 | 2-90 | 200.0 | 108 |
| Comparative Example 1 | 0.5 | 6590 | 210° C. × 13 hr | 41 | Thin film + fine particles | 20-210 | 2-105 | 197.9 | 137 |
| Comparative Example 2 | 0 | — | 210° C. × 13 hr | — | — | — | — | 198.2 | 235 |
| Conventional Example | $Li_{1.03}Ni_{0.77}Co_{0.20}Al_{0.03}O_2$/Ammonium paratungstate | | | — | — | — | — | 179.9 | 218 |

[Evaluation]

As is obvious from Table 1, the composite hydroxide particles and the positive electrode active materials of Examples 1 to 3 were produced according to the present invention and therefore formed batteries having high initial discharge capacity and low positive electrode resistance as compared with Conventional Example, and excellent characteristics.

Figure 2:
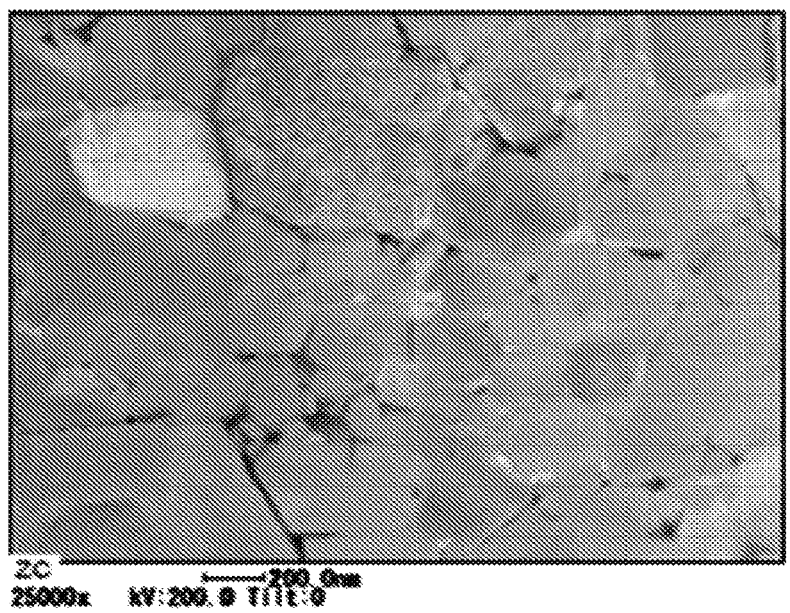
FIG. 2 is an image at 25000-fold magnification by transmission-type electron microscope observation of a cross section of the positive electrode active material of the present invention.
Figure 3:
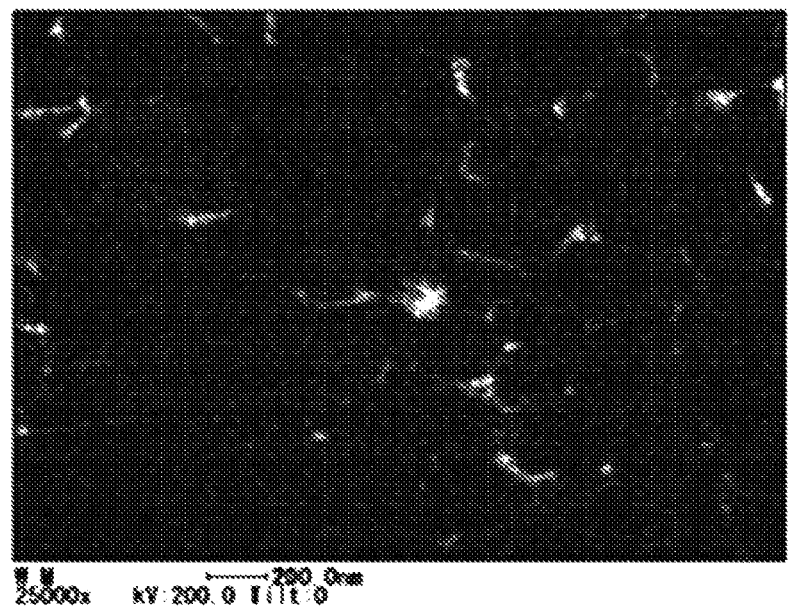
FIG. 3 is a mapping diagram of results of analysis with accessory EDX of tungsten in the field of view of FIG. 2.

Further, an example of the cross-sectional observation results of the positive electrode active material obtained in the examples of the present invention by TEM is shown in FIG. 2 and FIG. 3, where it was confirmed that the obtained positive electrode active material was constituted by primary particles and secondary particles formed by aggregation of the primary particles, and the compound containing tungsten and lithium was formed on the surface of the primary particles.

Meanwhile, those of Comparative Example 1, in which the amount of tungsten with respect to the number of atoms of Ni, Co and M contained in the lithium-metal composite oxide powder was almost the same as in Example 1, were obtained by a method where an alkaline solution containing tungsten was added and mixed after water washing, and were deteriorated in dispersion uniformity as compared with Examples and caused the compound containing tungsten and lithium to be unevenly formed, thereby resulting in an increase in positive electrode resistance as compared with Example 1.

In Comparative Example 2, since the compound containing W and Li according to the present invention was not formed on the surface of the primary particles, the positive electrode resistance was considerably high and it was difficult to meet the requirement to enhance the power.

In Conventional Example, since the mixing with the solid tungsten compound was performed, W was not sufficiently dispersed and Li was not supplied into the compound, resulting in considerably high positive electrode resistance.

It can be confirmed from the above results that a nonaqueous electrolyte secondary battery using the positive electrode active material obtained by the present invention has high initial discharge capacity and also low positive electrode resistance and forms a battery having excellent characteristics.

The nonaqueous electrolyte secondary battery of the present invention is suitable for power sources of small portable electronic devices (such as laptop personal computers and mobile phone terminals) that constantly require high capacity and is suitable for batteries for electric cars that require high power.

Further, the nonaqueous electrolyte secondary battery of the present invention has excellent safety and allows size reduction and power enhancement, and therefore it is suitable as a power source for electric cars where there is a restriction on the mounting space. The present invention can be used not only as a power source for electric cars which are purely driven by electric energy but also as a power source for so-called hybrid vehicles that is used in combination with a combustion engine such as a gasoline engine and a diesel engine.

REFERENCE SIGNS LIST

1: Coin type battery
2: Case
2a: Positive electrode can
2b: Negative electrode can
2c: Gasket
3: Electrode
3a: Positive electrode
3b: Negative electrode
3c: Separator

What is claimed is:

1. A method for producing a positive electrode active material for nonaqueous electrolyte secondary batteries, comprising:
a mixing step of adding a tungsten compound powder having a solubility A adjusted to 2.0 g/L or less to a lithium-metal composite oxide powder so as to reach a solid-liquid ratio of 500 to 1500 g per 1 L and stirring them in water washing of the lithium-metal composite oxide powder to form a slurry having a slurry temperature of 15 to 35° C. and a pH value of the slurry of 11.5 to 13.5, the solubility A being determined by stirring the tungsten compound in water having a pH of 12.5 at 25° C. for 20 minutes, the lithium-metal composite oxide powder being represented by a general formula: $Li_cNi_{1-x-y}Co_xM_yO_2$, where $0 \le x \le 0.35$, $0 \le y \le 0.35$, and $0.97 \le c \le 1.25$, are satisfied, and M is at least one element selected from Mn, V, Mg, Mo, Nb, Ti and Al, and being composed of primary particles and secondary particles formed by aggregation of the primary particles, followed by solid-liquid separation, to thereby obtain a tungsten-containing mixture with the tungsten compound dispersed in the lithium-metal composite oxide powder; and
a heat-treating step of heat-treating the tungsten-containing mixture obtained in the mixing step at a temperature of 100 to 600° C. in an oxygen atmosphere or in a vacuum atmosphere to uniformly disperse tungsten on a surface of the primary particles of the lithium-metal composite oxide powder, and thereafter form a compound containing tungsten and lithium from the tungsten dispersed uniformly on the surface of the primary particles and lithium in the tungsten-containing mixture, on the surface of the primary particles of the lithium-metal composite oxide powder.

2. The method for producing a positive electrode active material for nonaqueous electrolyte secondary batteries according to claim 1, wherein the tungsten compound added in the mixing step is lithium tungstate.

3. The method for producing a positive electrode active material for nonaqueous electrolyte secondary batteries according to claim 2, wherein the lithium tungstate is obtained by a reaction of lithium hydroxide and a tungsten compound.

4. The method for producing a positive electrode active material for nonaqueous electrolyte secondary batteries according to claim 1, wherein an amount of tungsten contained in the tungsten-containing mixture is 0.05 to 3.0 at % with respect to the total number of atoms of Ni, Co and M contained in the lithium-metal composite oxide powder mixed.

5. The method for producing a positive electrode active material for nonaqueous electrolyte secondary batteries according to claim 1, wherein the tungsten compound added in the mixing step comprises 80% or more of $(Li_2WO_4)_7(H_2O)_4$.

6. The method for producing a positive electrode active material for nonaqueous electrolyte secondary batteries according to claim 1, wherein a temperature in the water washing in the mixing step is 40° C. or less.

* * * * *